United States Patent
Bowden et al.

(10) Patent No.: US 10,429,968 B2
(45) Date of Patent: Oct. 1, 2019

(54) RECONFIGURABLE MESSAGING ASSEMBLY

(71) Applicants: Upton Beall Bowden, Canton, MI (US); Theodore Charles Wingrove, Plymouth, MI (US); Michael Eichbrecht, Farmington Hills, MI (US); Andrew DeScisciolo, Canton, MI (US)

(72) Inventors: Upton Beall Bowden, Canton, MI (US); Theodore Charles Wingrove, Plymouth, MI (US); Michael Eichbrecht, Farmington Hills, MI (US); Andrew DeScisciolo, Canton, MI (US)

(73) Assignee: Visteon Global Technologies, INC., Van Buren Township, MI (US)

( * ) Notice: Subject to any disclaimer, the term of this patent is extended or adjusted under 35 U.S.C. 154(b) by 541 days.

(21) Appl. No.: 14/535,034

(22) Filed: Nov. 6, 2014

(65) Prior Publication Data

US 2016/0132164 A1    May 12, 2016

(51) Int. Cl.
*G06F 3/041*    (2006.01)
*G06F 1/16*    (2006.01)
(Continued)

(52) U.S. Cl.
CPC .......... *G06F 3/0412* (2013.01); *G06F 1/1605* (2013.01); *G06F 3/0484* (2013.01);
(Continued)

(58) Field of Classification Search
CPC ..... G06F 3/0412; G06F 3/0484; G06F 1/1605
(Continued)

(56) References Cited

U.S. PATENT DOCUMENTS 6,504,524 B1 * 1/2003 Gates .............. G02F 1/167
  315/169.3
6,661,448 B2 * 12/2003 Lunden ............ H04H 60/12
  348/14.02

(Continued)

FOREIGN PATENT DOCUMENTS

DE    10 2006 015 332 A1    11/2006
DE       600 28 088 T2       12/2006
(Continued)

OTHER PUBLICATIONS

Nicole Lee, https://www.engadget.com/2013/12/02/e-ink-fina/, Dec. 2, 2013, visited Sep. 27, 2018.

*Primary Examiner* — Daeho D Song
(74) *Attorney, Agent, or Firm* — Quinn IP Law

(57) ABSTRACT

A reconfigurable messaging assembly for a vehicle includes a low power bi-stable display attached to the vehicle for displaying an image, text, or video. A processor and a storage device are coupled with the display. A communicator including transceivers for WiFi, Bluetooth, and NFC is connected to the display for communicating with a portable electronic device. An interface device including a camera and a touchscreen both disposed on the vehicle is also coupled with the display and the processor for interacting with a primary user and a secondary user and for acquiring the images, text, and videos. The interface device is operatively connected to the communicator for interacting with a primary user and a secondary user. The assembly enables a primary user and a secondary user to show an image, text, or video using the display and to provide interaction with the primary user and the secondary user.

19 Claims, 9 Drawing Sheets

(51) Int. Cl.
*G06F 3/0484* (2013.01)
*H04W 4/80* (2018.01)

(52) U.S. Cl.
CPC .......... *H04W 4/80* (2018.02); *G09G 2380/04* (2013.01); *Y02D 70/00* (2018.01); *Y02D 70/142* (2018.01); *Y02D 70/144* (2018.01); *Y02D 70/166* (2018.01)

(58) Field of Classification Search
USPC ........................................................ 715/740
See application file for complete search history.

(56) References Cited

U.S. PATENT DOCUMENTS

| | | | |
|---|---|---|---|
| 7,923,962 B2 | 4/2011 | Jovanovich | |
| 8,510,196 B1* | 8/2013 | Brandmaier | G06Q 40/08 705/35 |
| 8,733,641 B1* | 5/2014 | Drew | G06Q 50/22 235/381 |
| 2004/0153362 A1* | 8/2004 | Bauer | G06Q 40/02 705/4 |
| 2005/0041212 A1* | 2/2005 | Weidow, III | G03B 21/10 353/13 |
| 2005/0212909 A1* | 9/2005 | Takehara | H04N 5/232 348/36 |
| 2006/0202925 A1* | 9/2006 | Manning | G02F 1/13476 345/87 |
| 2006/0235753 A1 | 10/2006 | Kameyama | |
| 2008/0037306 A1* | 2/2008 | Marhefka | G09G 3/3629 363/149 |
| 2008/0143760 A1* | 6/2008 | Ellis | G06T 1/20 345/698 |
| 2008/0188267 A1* | 8/2008 | Sagong | G06F 1/1626 455/566 |
| 2008/0222687 A1* | 9/2008 | Edry | H04L 51/04 725/105 |
| 2009/0113775 A1 | 5/2009 | Netter | |
| 2009/0115788 A1* | 5/2009 | Black | G06F 3/1454 345/520 |
| 2009/0136688 A1* | 5/2009 | Wang | C09K 19/58 428/1.3 |
| 2009/0271710 A1* | 10/2009 | Montz | G06F 3/038 715/740 |
| 2009/0299857 A1* | 12/2009 | Brubaker | G06Q 30/02 705/14.66 |
| 2010/0010732 A1* | 1/2010 | Hartman | G01C 21/3469 701/532 |
| 2010/0121693 A1* | 5/2010 | Pacana | G06Q 30/02 705/14.4 |
| 2010/0123732 A1* | 5/2010 | Jenks | G06F 3/1446 345/592 |
| 2010/0188548 A1* | 7/2010 | Robinson | H04N 5/222 348/333.01 |
| 2010/0315367 A1* | 12/2010 | Moy | A41D 25/00 345/173 |
| 2011/0023077 A1* | 1/2011 | Simon | H04N 5/445 725/134 |
| 2011/0074738 A1* | 3/2011 | Ye | G06F 3/0428 345/175 |
| 2011/0161998 A1* | 6/2011 | Alberth | H04N 7/18 725/10 |
| 2011/0291822 A1 | 12/2011 | Boston et al. | |
| 2012/0069132 A1* | 3/2012 | Kato | H04L 12/1827 348/14.02 |
| 2012/0089273 A1 | 4/2012 | Seder et al. | |
| 2012/0124511 A1* | 5/2012 | Kawakami | G06F 1/1694 715/799 |
| 2012/0229377 A1* | 9/2012 | Kim | G06F 3/017 345/157 |
| 2012/0229425 A1* | 9/2012 | Barrus | G06F 3/04883 345/179 |
| 2012/0268235 A1* | 10/2012 | Farhan | G05B 9/02 340/3.1 |
| 2012/0330690 A1* | 12/2012 | Goslinga | G06Q 40/00 705/4 |
| 2013/0018726 A1* | 1/2013 | Ionescu | G06Q 30/00 705/14.49 |
| 2013/0031540 A1* | 1/2013 | Throop | G06F 8/654 717/173 |
| 2013/0059598 A1* | 3/2013 | Miyagi | H04W 4/023 455/456.1 |
| 2013/0144968 A1* | 6/2013 | Berger | H04L 67/32 709/217 |
| 2013/0173358 A1* | 7/2013 | Pinkus | G06Q 30/0265 705/14.1 |
| 2013/0174051 A1* | 7/2013 | Schatzberger | G06F 3/04842 715/748 |
| 2013/0189925 A1* | 7/2013 | Staskawicz | H04B 7/24 455/41.1 |
| 2013/0205380 A1* | 8/2013 | Avni | H04L 63/0853 726/7 |
| 2014/0004793 A1* | 1/2014 | Bandyopadhyay | H04L 63/0428 455/41.1 |
| 2014/0025259 A1* | 1/2014 | Szwabowski | B60W 50/00 701/36 |
| 2014/0033050 A1* | 1/2014 | Shin | G06F 3/048 715/733 |
| 2014/0047347 A1* | 2/2014 | Mohn | G08G 1/00 715/738 |
| 2014/0111323 A1* | 4/2014 | Strout | B60Q 1/268 340/425.5 |
| 2014/0129301 A1* | 5/2014 | Van Wiemeersch | G07F 17/0057 705/13 |
| 2014/0142948 A1* | 5/2014 | Rathi | G06F 3/167 704/270.1 |
| 2014/0164579 A1* | 6/2014 | Douthitt | G07C 5/008 709/219 |
| 2014/0180817 A1* | 6/2014 | Zilkha | G06Q 30/02 705/14.55 |
| 2014/0215347 A1* | 7/2014 | Lin | G08C 17/02 715/740 |
| 2014/0249913 A1* | 9/2014 | Endo | G06Q 30/02 705/14.45 |
| 2014/0253444 A1* | 9/2014 | Cheng | G06F 3/04883 345/158 |
| 2014/0256292 A1* | 9/2014 | Son | H04W 4/14 455/412.1 |
| 2014/0256304 A1* | 9/2014 | Frye | H04W 4/21 455/418 |
| 2014/0278781 A1* | 9/2014 | Liu | G06Q 30/0203 705/7.32 |
| 2015/0135336 A1* | 5/2015 | Arasavelli | H04B 7/26 726/29 |
| 2015/0220991 A1* | 8/2015 | Butts | G06Q 30/0265 705/14.62 |
| 2015/0332037 A1* | 11/2015 | Tse | G06F 21/36 726/19 |

FOREIGN PATENT DOCUMENTS

| | | |
|---|---|---|
| DE | 10 2011 114 959 A1 | 4/2012 |
| DE | 10 2013 003 044 A1 | 8/2014 |
| DE | 10 2013 006 070 A1 | 10/2014 |
| EP | 2267978 A1 | 12/2010 |
| JP | 2005043138 A | 2/2005 |
| JP | 2006082603 A | 3/2006 |
| JP | 2009530669 A | 8/2009 |
| JP | 2010113510 A | 5/2010 |
| JP | 2011154535 A | 8/2011 |
| JP | 2012048461 A | 3/2012 |
| WO | 01/45065 A2 | 6/2001 |
| WO | 2008/091201 A1 | 7/2008 |
| WO | 2013013192 A2 | 1/2013 |

(56) References Cited

FOREIGN PATENT DOCUMENTS

| WO | 2013101046 A1 | 7/2013 |
|---|---|---|
| WO | 2013118088 A1 | 8/2013 |

\* cited by examiner

RECONFIGURABLE MESSAGING ASSEMBLY

BACKGROUND

Reconfigurable messaging assemblies may be attached to a structure to display various images, text, or videos. In one example, the assembly includes a housing that has an interior and exterior. A display is attached to the housing for displaying an image, text, or video. The assembly also includes an interface device.

Methods of operating a reconfigurable messaging assembly are also disclosed which include the step of interacting with a primary user. These methods proceed by transferring the image, text, or video to the reconfigurable messaging assembly and storing the image, text, or video. These methods also include the steps of processing the image, text, or video and displaying the text, image, or video on a display. However, such assemblies do not adequately support interaction with a user that is not a primary user.

SUMMARY

The reconfigurable messaging assembly that is disclosed provides for interacting with the secondary user. The interface device is disposed on the exterior of the housing and is connected to the display for interacting with a primary user and a secondary user.

Thus several advantages of one or more aspects of the reconfigurable messaging assembly that is disclosed are that it provides for interacting a secondary user during various situations in which a user who is not the primary user may wish to interact with the display.

BRIEF DESCRIPTION OF THE DRAWINGS

Other advantages will be readily appreciated, as the same becomes better understood by reference to the following detailed description when considered in connection with the accompanying drawings wherein.

DETAILED DESCRIPTION OF THE ENABLING EMBODIMENTS

Reconfigurable messaging assemblies 20 which are currently available fail to provide a solution which not only allows interaction with a primary user, but also allows interaction with secondary users. The primary user would for example be the owner of the vehicle and a secondary user could be anyone who chooses to interact with the reconfigurable messaging assembly 20 (e.g. another motorist). More particularly, current assemblies allow the primary user to transfer or communicate with the reconfigurable assembly and select one or more images, text, or videos to be displayed. Secondary users may view the images, text, or videos selected by the primary user, but do not have the ability to provide any input or alter any of the images, text, or videos being displayed. There exist many instances in which it would be useful for a secondary user to interact with the reconfigurable messaging assembly 20.

As one example, a vehicle owner (i.e. a primary user) may allow a friend or family member (i.e. a secondary user) to use their vehicle. While operating the vehicle, the secondary user may notice that the vehicle has begun pulling to the left. Reconfigurable messaging assemblies 20 which are currently available would not allow the secondary user to interact with the reconfigurable messaging assembly 20 to notify other users of the vehicle or the primary user of the issue.

Figure 1:
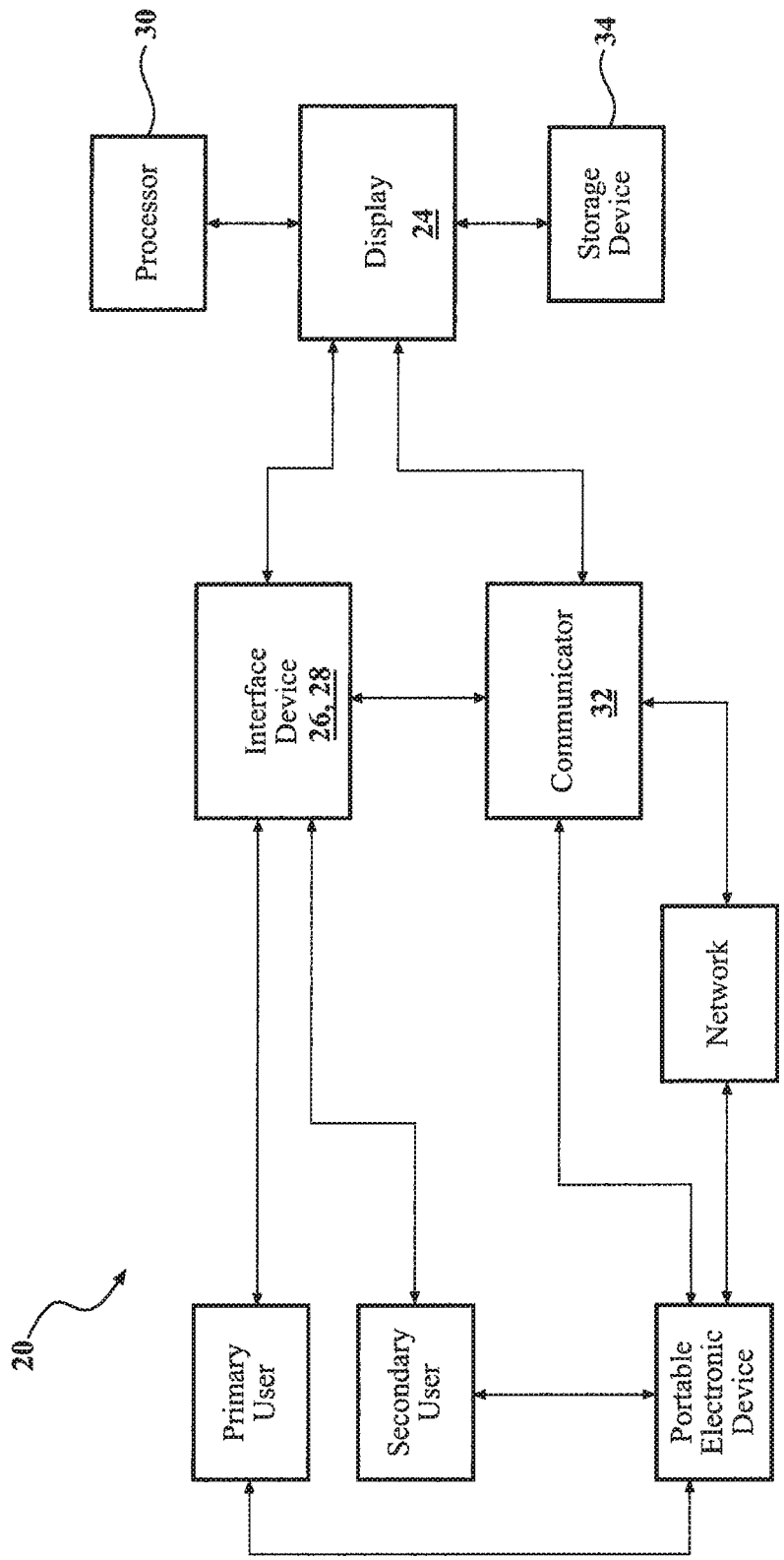
FIG. 1 is a block diagram of an embodiment of the reconfigurable messaging assembly.

Referring to the Figures, wherein like numerals indicate corresponding parts throughout the several views, a reconfigurable messaging assembly is generally shown at 20. The reconfigurable messaging assembly 20 of one embodiment includes a housing 22, generally indicated, that has an interior and exterior. The reconfigurable assembly also includes a display 24 that is attached to the housing 22 to show one of an image, text, and video. As best shown in FIG. 1, an interface device 26, 28, a processor 30, a communicator 32, and a storage device 34 are coupled to the display 24. The interface device 26, 28 enables a primary user and a secondary user to interact with the assembly. In operation, the first step is 36 interacting with the primary user. More specifically this is accomplished by 38 transferring the image, text, or video to the reconfigurable messaging assembly. Next, 40 storing the image, text, or video and 42 processing the image, text, or video. Then 44 displaying the image, text, or video with the reconfigurable messaging assembly 20 and 46 interacting with the secondary user.

Figure 2:
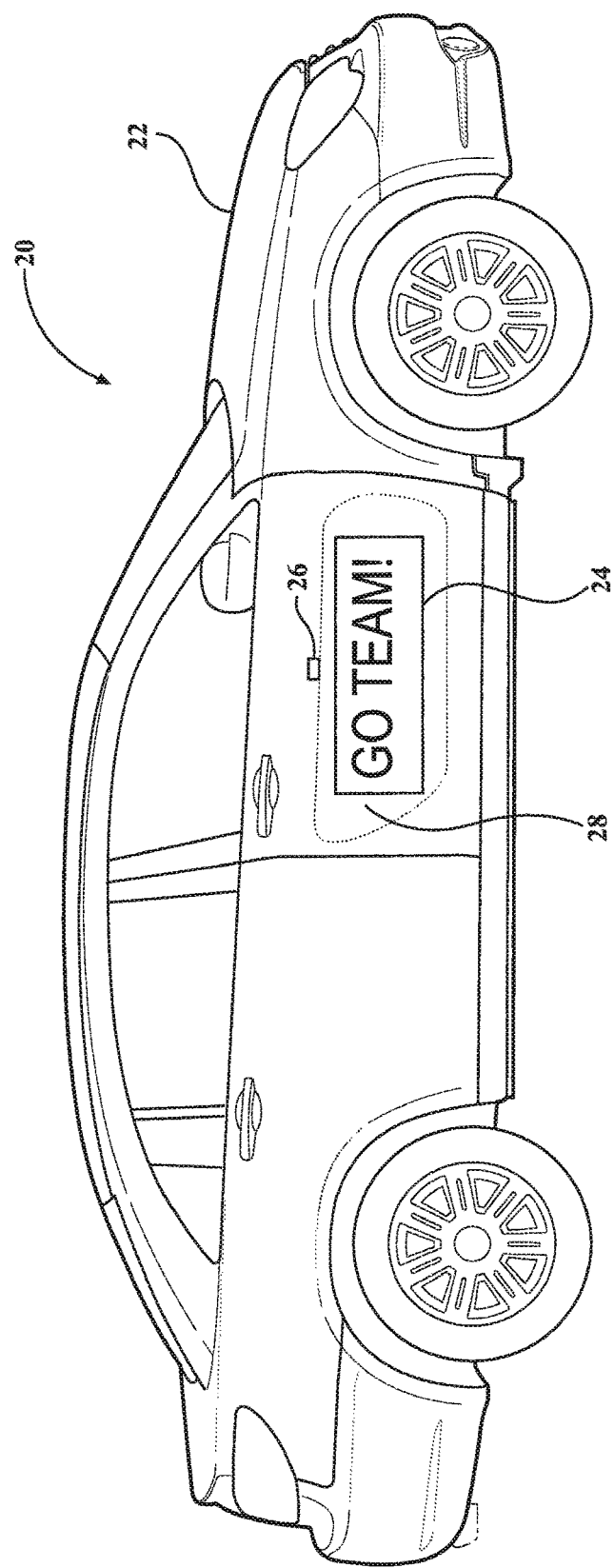
FIG. 2 is a perspective view of an embodiment of the reconfigurable messaging assembly installed on the exterior of a vehicle.
Figure 3:
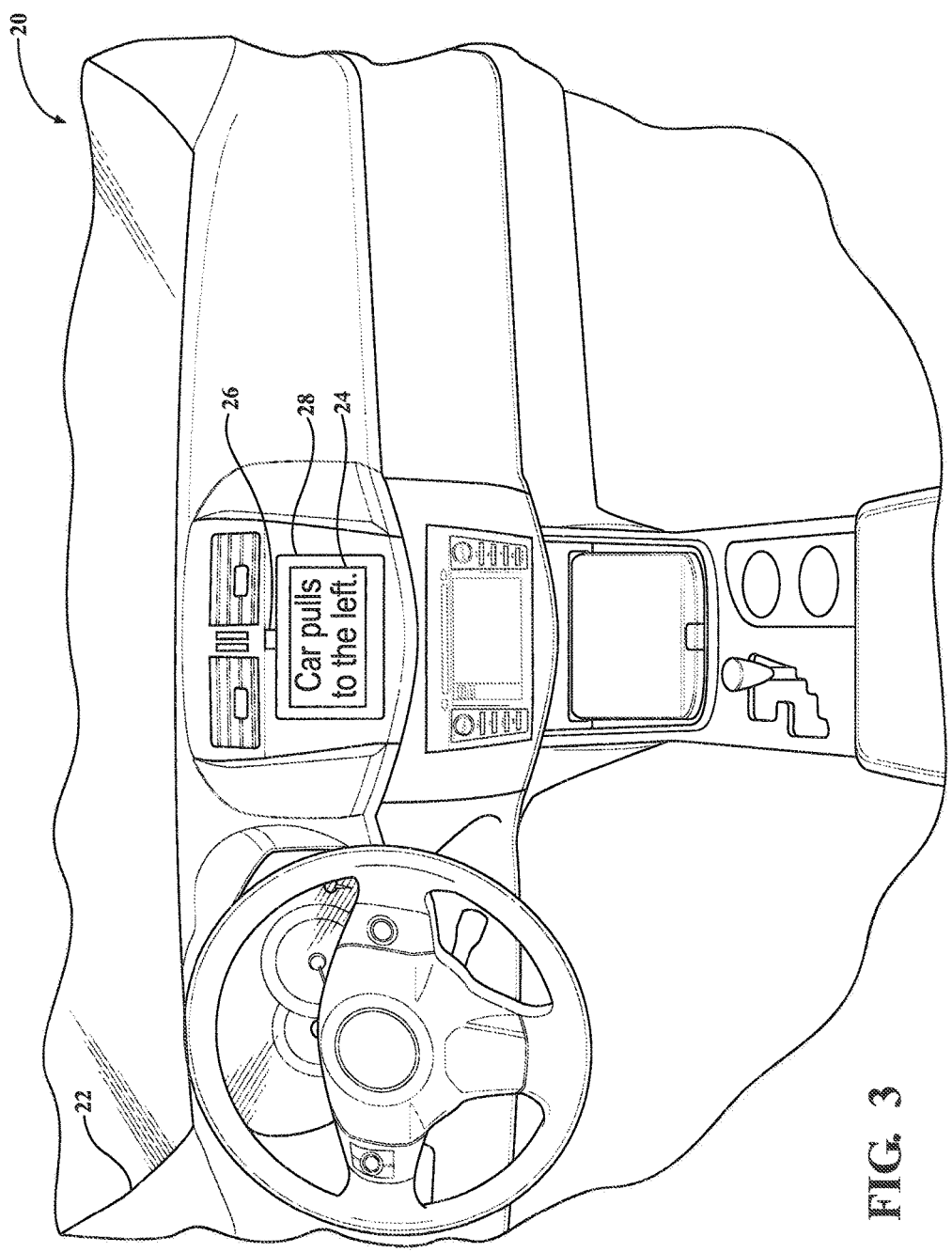
FIG. 3 is a perspective view of an embodiment of the reconfigurable messaging assembly installed on the interior of a vehicle.
Figure 4:
FIG. 4 illustrates example contents of the display of an embodiment of the reconfigurable messaging assembly.

The display 24 is disposed exteriorly of the housing 22 in one embodiment (FIG. 2), but may also be disposed interiorly of the housing 22 (FIG. 3). In an embodiment, the housing 22 is a vehicle; however, it should be appreciated that the housing 22 could be of many other types such as, but not limited to buildings or aircraft. The display 24 is preferably of the type which consumes a low amount of power and additionally is bi-stable (i.e. the display 24 is able to continue to show an image or text after losing power). In one embodiment, the display 24 takes the form of a low power bi-stable display 24, however, it should be appreciated that other types of displays 24 may be used such as, but not limited to a Liquid Crystal Display 24 (LCD) or an Organic Light Emitting Diode (OLED) display 24.

The processor 30 is directly connected to the display 24 in an embodiment, however it should be appreciated that the processor 30 may actually be disposed in a separate module in the vehicle or electronic device which is connected to the display 24 wirelessly or through a wired connection. The storage device 34 is also coupled with the processor 30 for storing the image, text, and video. As with the processor 30, the storage device 34 may be directly connected to the display 24, but may instead be disposed in a separate module in the vehicle or electronic device which is connected to the display 24 wirelessly or through a wired connection.

The communicator 32 is connected to the processor 30 and to the display 24 for communicating with a portable electronic device. Examples of such portable electronic devices include, but are not limited to mobile phones and laptop computers. In an embodiment, the communicator 32 includes a WiFi transceiver, a Bluetooth transceiver, and a Near Field Communication (NFC) transceiver each connected to the display 24 for communication with a portable electronic device. Near Field Communication would also allow the showing of a predetermined image, text, or video on the display 24 in response to the portable electronic device with NFC being in proximity to the display 24. The communicator 32 also includes an embedded modem connected to the display 24 that is also used for communication with a portable electronic device. The embedded modem enables a user to send various commands and messages to the display 24 such as, but not limited to text messages. Other types of wired or wireless communication hardware and software may also be incorporated in the communicator 32.

The interface device 26, 28 is coupled with the display 24 for interacting with a primary user and a secondary user. The primary user and secondary user may or may not be in close proximity to the vehicle as they interact with the reconfigurable messaging assembly 20. The interface device 26, 28 is also coupled with the processor 30 in an embodiment for acquiring the images, text, and video which are stored on the storage device 34 and displayed on the display 24. The interface device 26, 28 is operatively connected to the communicator 32 for interacting with a primary user and a secondary user. In an embodiment, the interface device 26, 28 includes a camera 26 and a touchscreen 28 both disposed on the exterior of the vehicle (FIG. 2). However, it should be understood that the interface device 26, 28 could instead or additionally include a personal electronic device or some other type of input device such as, but not limited to a keyboard, mouse, stylus, or joystick.

Figure 7:
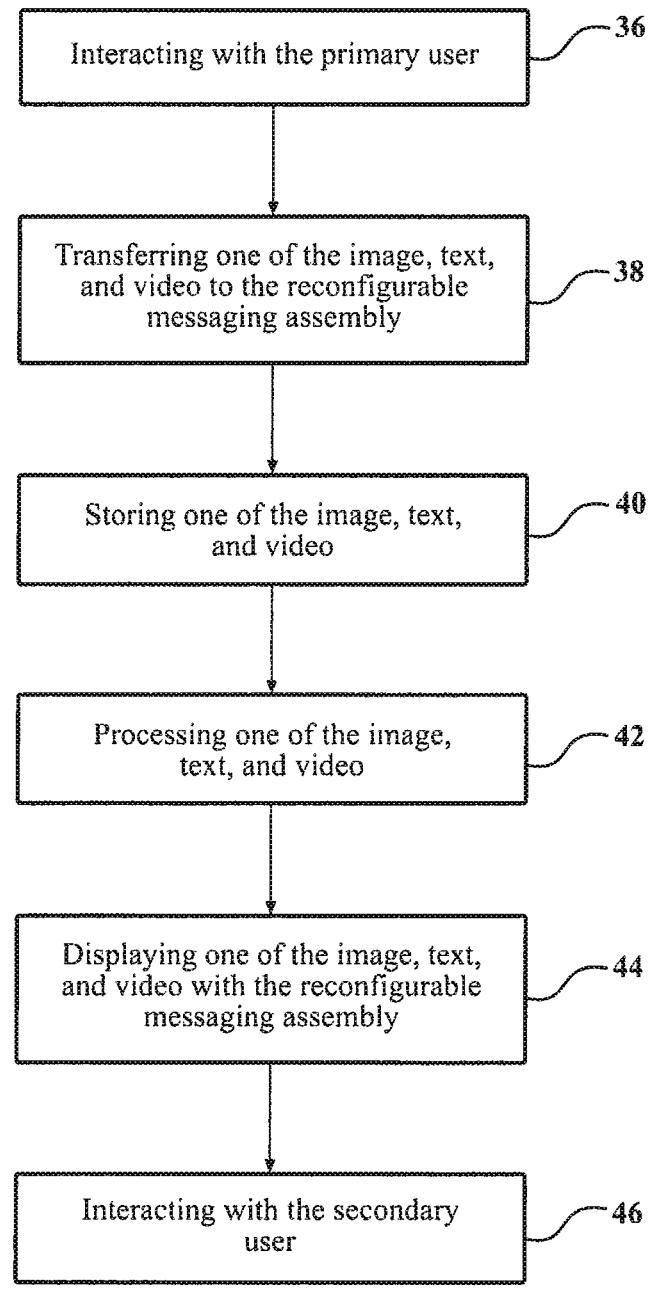
FIG. 7 is a flow chart illustrating the steps of operating an embodiment of the reconfigurable messaging assembly.

As illustrated by a flow chart in FIG. 7, a method of operating a reconfigurable messaging assembly 20 is also disclosed. The method enables a primary user and a secondary user to show an image, text, or video using the reconfigurable messaging assembly 20. The method includes the step of 36 interacting with the primary user. Next 38 transferring the image, text, or video to the reconfigurable messaging assembly. The method proceeds with 40 storing the image, text, or video and 42 processing the image, text, or video. The method includes a step of 44 displaying the image, text, or video on the display. The method further includes the step of 46 interacting with the secondary user.

Figure 6:
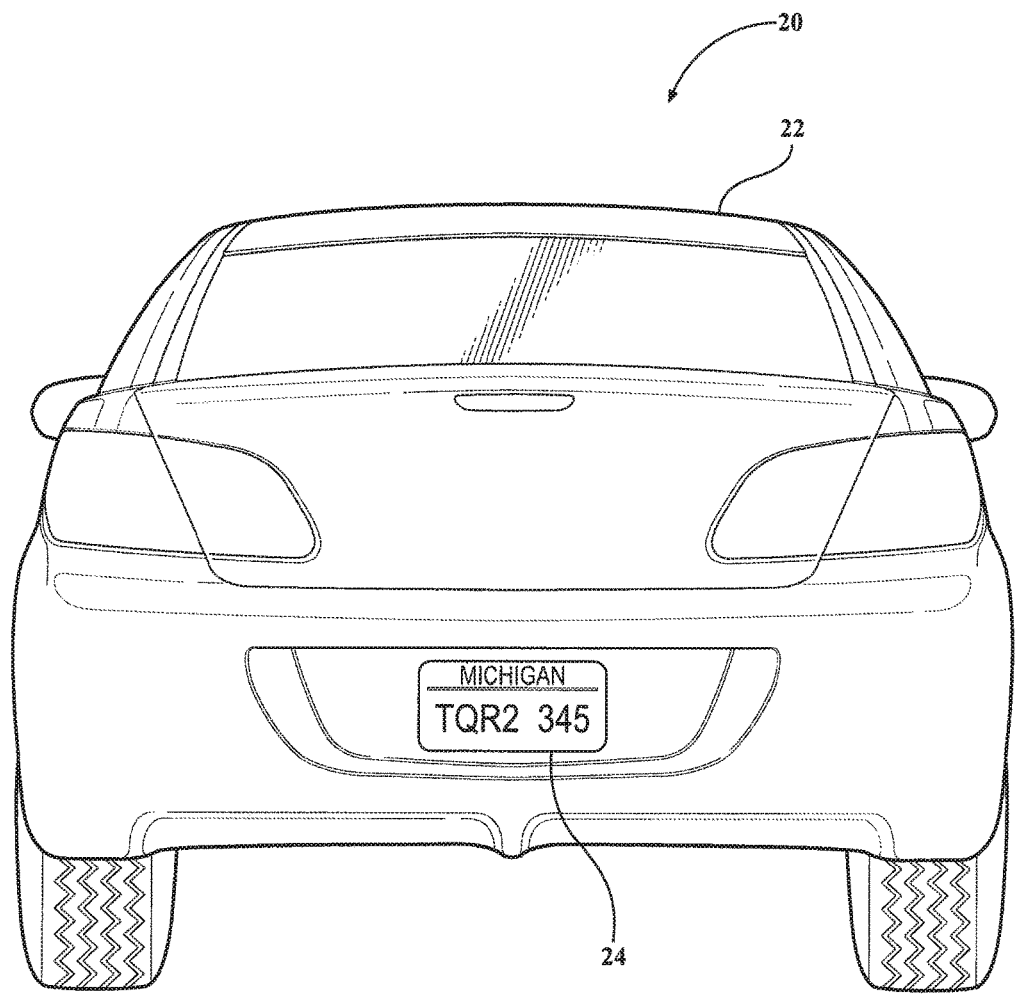
FIG. 6 is a perspective view of an embodiment of the reconfigurable messaging assembly installed on the exterior of a vehicle.

The reconfigurable messaging assembly 20 also allows the display 24 to have uses such as, but not limited to displaying advertisements, displaying a logo or text associated with a favorite sports team (FIG. 2), and displaying political messages. In one embodiment, a method step of 48 updating the display in response to a specific calendar event is included. The specific calendar event can include events, such as, but not limited to a change in the season (i.e. baseball team logo during baseball season and automatically switch to football team logo during football season). Another embodiment includes the method step of 50 displaying a license plate number and vehicle registration information and enables the display 24 to be used as a replacement for a stamped or printed license plate since the display 24 would show a license plate number and vehicle registration information (FIG. 6) normally stamped or printed on a license plate. Furthermore, the method would also allow the display 24 to be used by a car dealership to show the feature set of the vehicle and even a QR code or other means for a prospective buyer to obtain more information.

Figure 5:
FIG. 5 illustrates example contents of the display of an embodiment of the reconfigurable messaging assembly.
Figure 8:
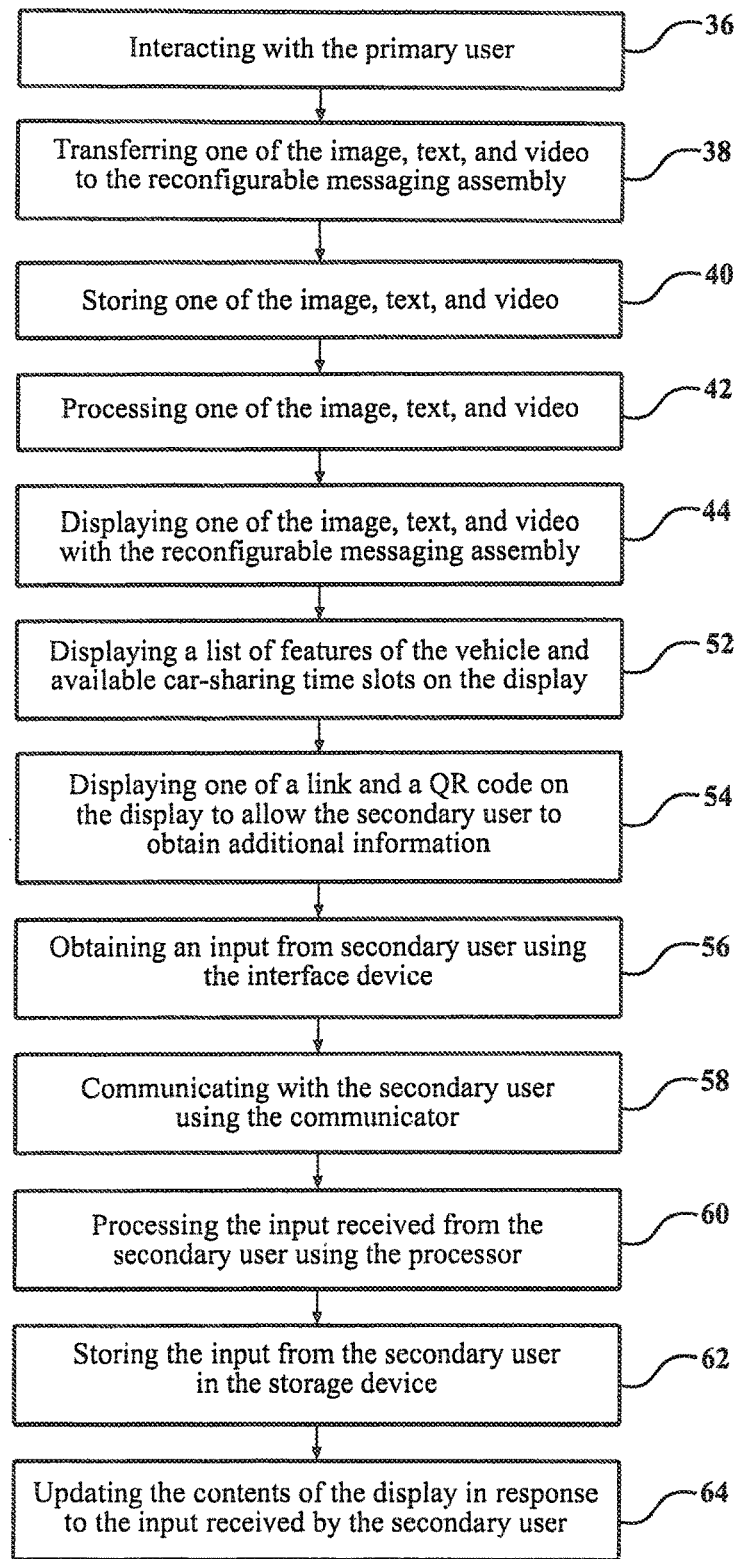
FIG. 8 is a flow chart illustrating the steps of operating an embodiment of the reconfigurable messaging assembly.

By another example illustrated by a flow chart in FIG. 8, the reconfigurable messaging assembly could be used with a car sharing service. Therefore, one embodiment of the reconfigurable messaging assembly 20 includes a method of operation further defining the step of 46 interacting with the secondary user as 52 displaying a list of features of the vehicle or available car-sharing time slots on the display (FIG. 5). Next, 54 displaying a link address or a QR code on the display to allow the secondary user to obtain additional information. The method proceeds by 56 obtaining an input from the secondary user using the interface device and 58 communicating with the secondary user using the communicator. The next steps are 60 processing the input received from the secondary user using the processor and 62 storing the input from the secondary user in the storage device. The method of this embodiment concludes by 64 updating the display in response to the input received by the secondary user. For example, if the secondary user indicates that he or she would like to reserve the vehicle for a particular time slot through the interface device 26, 28 or through a portable electronic device which is wirelessly connected to the display 24 through the communicator 32, the input received will be processed and the display 24 can then be updated accordingly (e.g. removing the chosen time slot from the list of available time slots).

Figure 9:
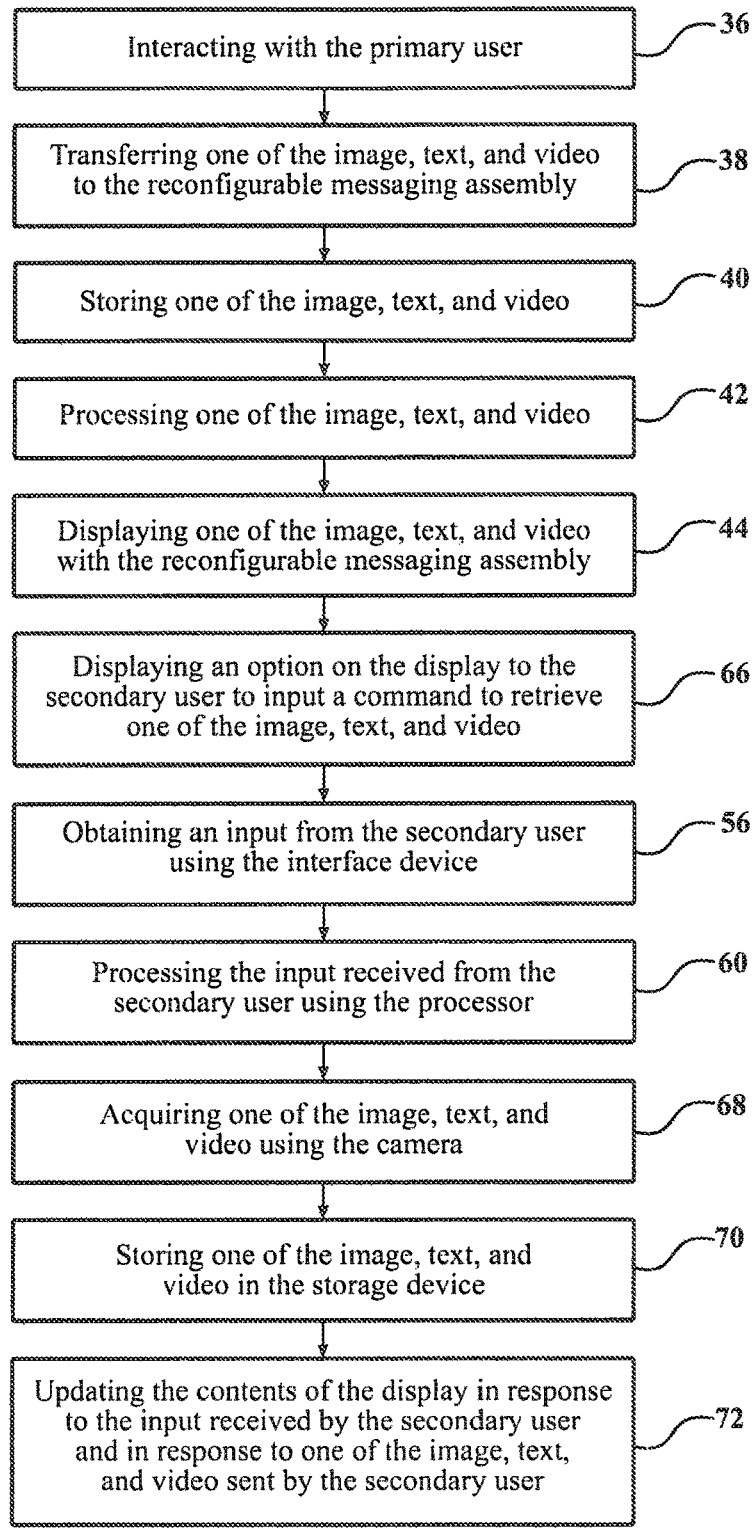
FIG. 9 is a flow chart illustrating the steps of operating an embodiment of the reconfigurable messaging assembly.

Yet another example of operation of the reconfigurable messaging assembly 20 is in operating the assembly to enable a secondary user to record an image, text or video message illustrated by a flow chart in FIG. 9. This would allow a secondary user to, for instance, leave their contact and insurance information in the event that the secondary user accidentally damages the vehicle while the vehicle is parked or to leave a message for some other purpose (e.g. question about a vehicle that is for sale). Another embodiment of the reconfigurable messaging assembly 20 includes a method of operation further defining the step of 46 interacting with the secondary user as 66 displaying an option on the display to the secondary user to input a command to acquire the image, text, or video. Next, the method includes the steps of 56 obtaining an input from the secondary user using the interface device and 60 processing the input received from the secondary user using the processor. The method then includes the step of 68 acquiring the image, text, or video using the camera. The method of this embodiment concludes by 70 storing the image, text, or video in the storage device and 72 updating the contents of the display in response to the input received by the secondary user and in response to the image, text, or video sent by the secondary user. For instance, the display 24 could show some indication that the secondary user has successfully recorded and stored the message that they would like to leave.

Figure 10:
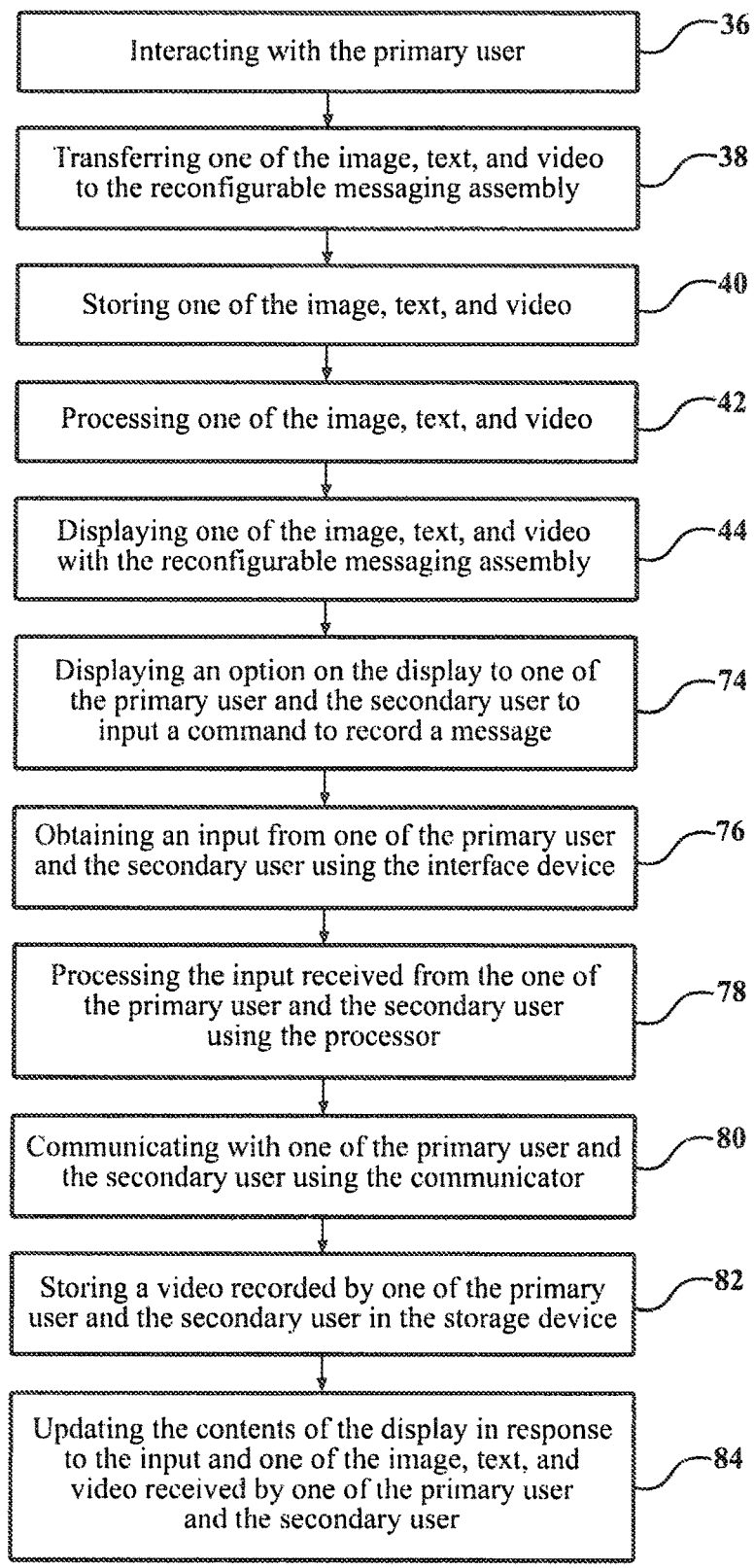
FIG. 10 is a flow chart illustrating the steps of operating an embodiment of the reconfigurable messaging assembly.

An additional example of operation of the reconfigurable messaging assembly is in operating the assembly to enable the primary user or the secondary user to transfer an image, text, or video message that has been recorded using a personal electronic device to the display 24 illustrated by a flow chart in FIG. 10. This would allow the secondary user to, for instance, leave a question and their contact information or leave a message that they noticed something about the vehicle (e.g. vehicle has low air in one of the tires). The primary user can also leave an image, text, or video message to respond to a question about the vehicle or for any other purpose. Therefore, another embodiment of the reconfigurable messaging display 24 includes a method of operation further including the step of 74 displaying an option on the display to the primary user or the secondary user to input a command to record a message. The next step of the method is 76 obtaining an input from the primary user or the secondary user using the interface device. The method proceeds by 78 processing the input received from the primary user or the secondary user using the processor and 80 communicating with the primary user or the secondary user using the communicator. The method of this embodiment concludes by 82 storing an image, text, or video recorded by the primary user or the secondary user in the storage device and 84 updating the display in response to the input and the image, text, or video received by the primary user or the secondary user.

Obviously, many modifications and variations are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A reconfigurable messaging assembly comprising:
   a display attached to a vehicle, and operable to present content, wherein the content includes one of an image, a video, a text, or a combination thereof; a processor coupled to the display;
   a storage device coupled to the display, and operable to store a primary content, a secondary content a primary video message and a secondary video message:
   an interface device coupled to the display, wherein the interface device includes a camera operable to record video content and a touchscreen; and
   a communicator coupled to the interface device and operable to communicate with a portable electronic device through a wireless connection;
   wherein the processor is operable to:
   store in the storage device the primary video message from the primary user as recorded by the camera;
   receive a first input from a primary user via the touchscreen;
   control the display to present the primary content from the storage device based on the first input from the primary user;
   receive a second input from a secondary user via the communicator and the wireless connection from the portable electronic device regarding the primary content, the secondary user being different than the primary user;
   control the display to update the primary content to the secondary content and present the primary video message from the storage device to the secondary user based on the second input from the secondary user;
   store in the storage device the secondary video message from the secondary user as recorded by the portable electronic device and received via the communicator and the wireless connection;
   receive a third input from the primary user from the touchscreen; and control the display to present the secondary video message from the storage device to the primary user in response to the third input from the primary user.

2. The reconfigurable messaging assembly as set forth in claim 1 wherein said communicator includes at least one of a WiFi transceiver, a Bluetooth transceiver, a near field communication transceiver, and embedded modem or any combination therefore connected to said interface device, and is operable to communicate with the portable electronic device via the wireless connection.

3. The reconfigurable messaging assembly as set forth in claim 1, wherein the processor is further configured to control the display to present a list of features of the vehicle.

4. The reconfigurable messaging assembly as set forth in claim 1, wherein the processor is further configured to control the display to present a quick response code, the quick response code being associated with additional information about the vehicle.

5. The reconfigurable messaging assembly as set forth in claim 1, wherein the processor is further configured to interface with a calendar, and based on the calendar being a specific date, control the display to present a date specific content associated with the specific date.

6. The reconfigurable messaging assembly as set forth in claim 1, wherein:
   the communicator has a near field communication transceiver operable to detect a near field communication capability nearby; and
   the processor is configured to control the display to show a predetermined display content comprising at least one of a predetermined image, a predetermined text, or a predetermined video on the display in response to the near field communication transceiver detecting the portable electronic device having the near field communication capability proximate to the near field communication transceiver.

7. The reconfigurable messaging assembly set forth in claim 1, wherein the display, the camera and the touchscreen are disposed on the exterior of the vehicle.

8. The reconfigurable messaging assembly set forth in claim 1, wherein the display, the camera and the touchscreen are disposed in the interior of the vehicle.

9. The reconfigurable messaging assembly set forth in claim 1, wherein the display is a low power bi-stable display.

10. A reconfigurable messaging assembly comprising:
    a display attached to a vehicle, and operable to present content;
    a processor coupled to the display;
    a storage device coupled to the display, and operable to store a primary content, a secondary content, a primary video message and a secondary video message;
    a camera coupled to the display, and operable to record the primary video message;
    a touchscreen coupled to the display, and operable to receive a first input and a third input; and
    a communicator coupled to the display, and operable to communicate with a portable electronic device through a wireless connection,
    wherein the processor is operable to:
    store in the storage device the primary video message as recorded by the camera;
    receive the first input from the touchscreen;
    control the display to present the primary content from the storage device in response to the first input;
    receive a second input via the communicator and the wireless connection from the portable electronic device after the primary content has been presented;

control the display to update the primary content to the secondary content and present the primary video message from the storage device in response to the second input;

store in the storage device the secondary video message as recorded by the portable electronic device and received via the communicator and the wireless connection;

receive the third input from the touchscreen; and control the display to present the secondary video message from the storage device in response to the third input.

11. The reconfigurable messaging assembly as set forth in claim 10, wherein the display, the camera and the touchscreen are mounted outside the vehicle.

12. The reconfigurable messaging assembly as set forth in claim 10, wherein the display, the camera and the touchscreen are mounted inside the vehicle.

13. The reconfigurable messaging assembly as set forth in claim 10, wherein:

the communicator includes a near field communication transceiver operable to detect a near field communication capability nearby; and the processor is operable to control the display to present a predetermined content in response to the near field communication transceiver detecting the portable electronic device having the near field communication capability proximate to the near field communication transceiver.

14. A reconfigurable messaging assembly comprising:

a display attachable to an exterior of a vehicle, and operable to present content; a processor coupled to the display;

a storage device coupled to the display, and operable to store a plurality of available time slots of the vehicle and a first image of a first user;

a camera coupled to the display, and operable to record video content and the first image of the first user;

a touchscreen coupled to the display, and operable to receive an initial input and a first input; and a communicator coupled to the interface device and the display, and operable to communicate with a plurality of portable electronic devices through a wireless connection, wherein the processor is operable to:

receive the initial input from the touchscreen;

control the display to present the plurality of available time slots of the vehicle in response to the initial input;

receive the first input from the touchscreen indicating a first selection of one or more first time slots of the plurality of available time slots;

control the camera to record the first image of the first user in response to the first input;

store the first image of the first user and the first selection of the one or more first time slots in the storage device;

control the display in response to the first input to update the available time slots to show that the one or more first time slots have been reserved; and control the communicator to send the first selection of the one or more first time slots to a first portable electronic device of the plurality of portable electronic devices proximate to the vehicle in response to updating the plurality of available time slots.

15. The reconfigurable messaging assembly as set forth in claim 14, wherein the processor is further operable to:

receive a second input via the communicator and the wireless connection from a second electronic device of the plurality of portable electronic devices indicating a second selection of one or more second time slots of the plurality of available time slots;

control the display in response to the second input to update the plurality of available time slots to show that the one or more second time slots have been reserved; and control the communicator to send the second selection of the one or more second time slots to the second electronic device in response to updating the plurality of available time slots.

16. The reconfigurable messaging assembly as set forth in claim 15, wherein the processor is further operational to:

control the camera to record a second image in response the second input; and store the second image and the second selection of the one or more second time slots in the storage device.

17. The reconfigurable messaging assembly as set forth in claim 14, wherein the plurality of available time slots are a plurality of ride sharing time slots, a plurality of vehicle reservation time slots or a combination thereof.

18. The reconfigurable messaging assembly as set forth in claim 14, wherein the processor is further operational to:

receive a second input from the touchscreen;

control the camera to record a first video message in response to the second input;

store the video message in the storage device;

receive a third input from the touchscreen; and control the display to play the first video message stored in the storage device in response to the third input.

19. The reconfigurable messaging assembly as set forth in claim 18, wherein the processor is further operational to:

receive a second video message from a second electronic device of the plurality of portable electronic devices via the communicator and the wireless connection;

store the second video message in the storage device;

receive a fourth input from the touchscreen; and control the display to play the second video message stored in the storage device in response to the fourth input.

* * * * *